United States Patent [19]
Doerfer et al.

[11] 3,789,456
[45] Feb. 5, 1974

[54] RIB CUTTING APPARATUS

[75] Inventors: Richard E. Doerfer, Waterloo;
Homer N. Leymaster, Cedar Falls;
Richard R. Neebel, Waterloo, all of Iowa

[73] Assignee: Doerfer Corporation, Cedar Falls, Iowa

[22] Filed: Sept. 9, 1971

[21] Appl. No.: 178,914

[52] U.S. Cl. ..................................... 17/1 R, 17/23
[51] Int. Cl. ............................................. A22c 17/00
[58] Field of Search ................................ 17/1 R, 23

[56] References Cited
UNITED STATES PATENTS
3,546,737  12/1970  Neebel et al. ..................... 17/1 R
3,159,869  12/1964  Vogt et al. ......................... 17/1 R
3,402,425  9/1968  Wexel ................................. 17/23

Primary Examiner—Louis G. Mancene
Assistant Examiner—D. L. Weinhold
Attorney, Agent, or Firm—Molinare; Allegretti; Neuitt & Witcoff

[57] ABSTRACT

An animal processing machine including rib cutting apparatus constructed and arranged so as to optimize the rib portion cut from an animal side. The rib cutting apparatus includes a frame having a movable conveyor thereon operable to convey an animal side to a rib cut knife. Driven rotatable means urge the animal side against the conveyor. The rib cut knife is mounted at an angle relative to the direction of conveyor travel and is adapted to be tilted relative to the animal side and then raised from the animal side to provide a desirable taper on the end of the cut ribs.

13 Claims, 6 Drawing Figures

Patented Feb. 5, 1974

Inventors:
Richard E. Doerfer
Homer N. Leymaster
Richard R. Neebel
By
Attys.

Patented Feb. 5, 1974

Inventors:
Richard E. Doerfer
Homer N. Leymaster
Richard R. Neebel

By

Attys.

Patented Feb. 5, 1974

Inventors:
Richard E. Doerfer
Homer N. Leymaster
Richard R. Neebel
By
Attys.

RIB CUTTING APPARATUS

BACKGROUND OF THE INVENTION

This invention relates to an animal side processing machine and more particularly to an improved rib cutting mechanism in such machine for optimizing the rib cut from the animal side.

There is shown in U.S. Pat. 3,546,737, granted Dec. 15, 1970, a machine for automatically removing the loin and ribs from the side of a hog. Hogs are not uniform in size and contour when they are butchered. The animal side processing machine of U.S. Pat. No. 3,546,737 yields quite uniform results through a combination of averaging and exact contour following. A scribe saw first encounters the animal side and separates the main rib section from the backbone. This is followed by a U-shaped loin pull knife which enters the side on the basis of average configuration. After automatically jumping over the shoulder bone and shifting its cutting angle several degrees, the loin pull knife actually conforms to the interior contour of the individual hog. The loin is then automatically ejected from the machine. Subsequently, at another station, the ribs are separated from the belly by rib cutting mechanism. The ribs are consumed as spare ribs and the bellies ultimately become bacon.

In use of the rib cutting mechanism forming a part of the processing machine of U.S. Pat. No. 3,546,737, the rib cut knife is disposed at an angle to the direction of conveyor travel and is raised from a first position parallel to the conveyor surface to a second parallel position in order to remove the ribs from the belly of the animal side. It has been found that too much belly is sometimes cut by the rib cut knife, thus causing downgrading of the entire rib portion. The maximum price cannot be obtained for the severed rib portion, thus resulting in loss of revenue to the meat processor. In addition, the belly may be cut too thin for proper handling thereof during the bacon slicing operation. The price received by the meat processor for bellies may also be reduced as a result of an improper cut made by the rib cut knife. It is desired that there be a taper at the end of the rib cut and that the contour of the ribs be followed as closely as possible to optimize the grading of the cut rib portion, as well as the belly of the animal side.

An object of the present invention is to provide an improved animal side processing machine having a rib cutting mechanism which incorporates means for tilting the rib cut knife so as to optimize the quality of a rib portion removed from the animal side, without adversely affecting the quality of the belly of the animal side.

Another object of the present invention is to provide an improved rib cutting mechanism for an animal side processing machine, the rib cutting mechanism comprising a rib cut knife, driven rotatable means urging the animal side against a conveyor or which conveys the animal side to the rib cut knife and means for tilting the rib cut knife relative to the animal side to provide a desirable taper on the end of the cut rib portion, while optimizing the cutting action to maintain maximum grading of the ribs. Other objects and advantages of the present invention will become more apparent hereinafter.

BRIEF DESCRIPTION OF THE DRAWINGS

There is shown in the attached drawings a presently preferred embodiment of the present invention wherein like numerals refer to like elements in the different views, and wherein.

DETAILED DESCRIPTION OF THE PRESENT INVENTION

Figure 1:
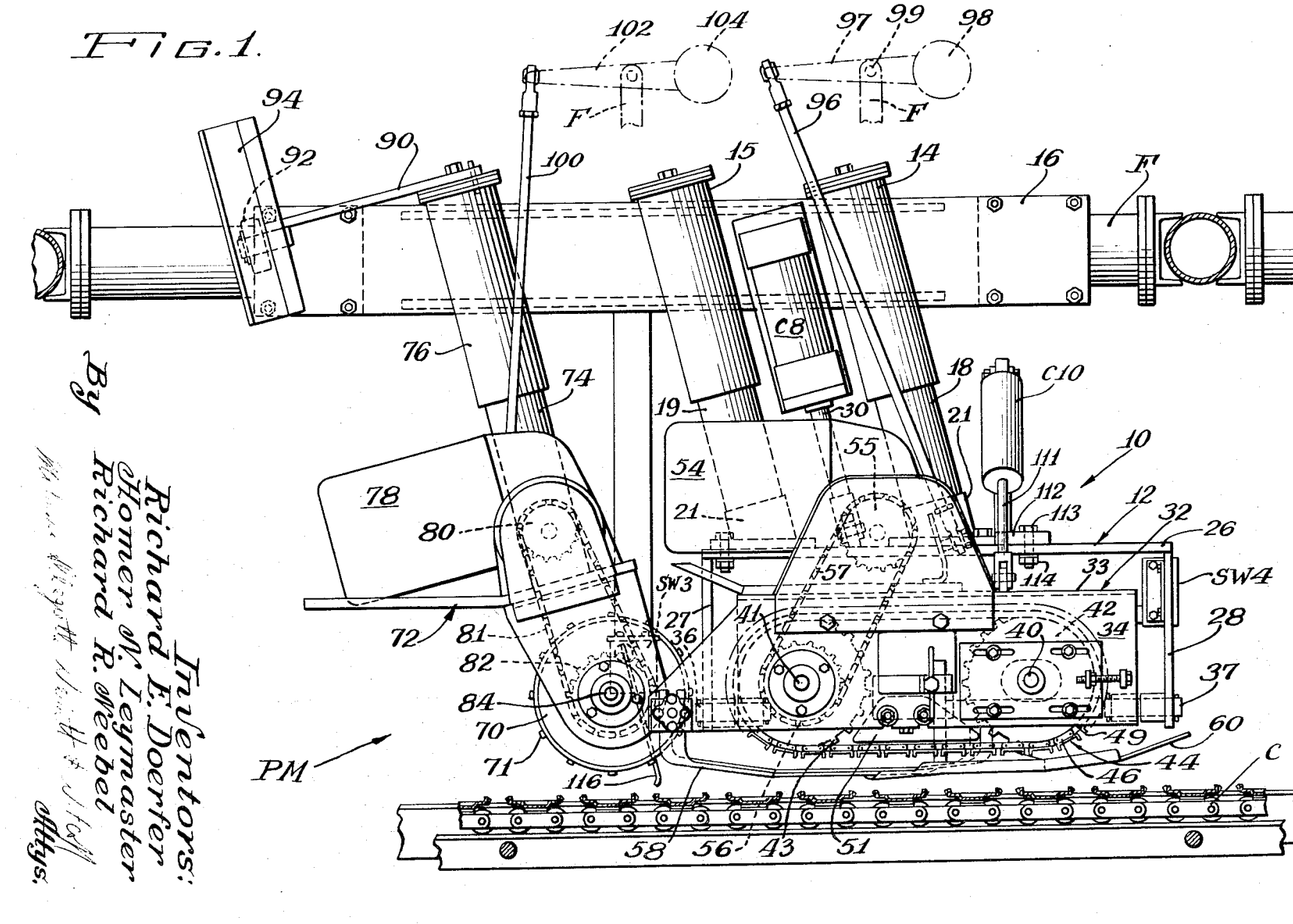
FIG. 1 is a front view of a portion of an animal side processing machine, illustrating the rib cutting mechanism embodying the principles of the present invention.
Figure 2:
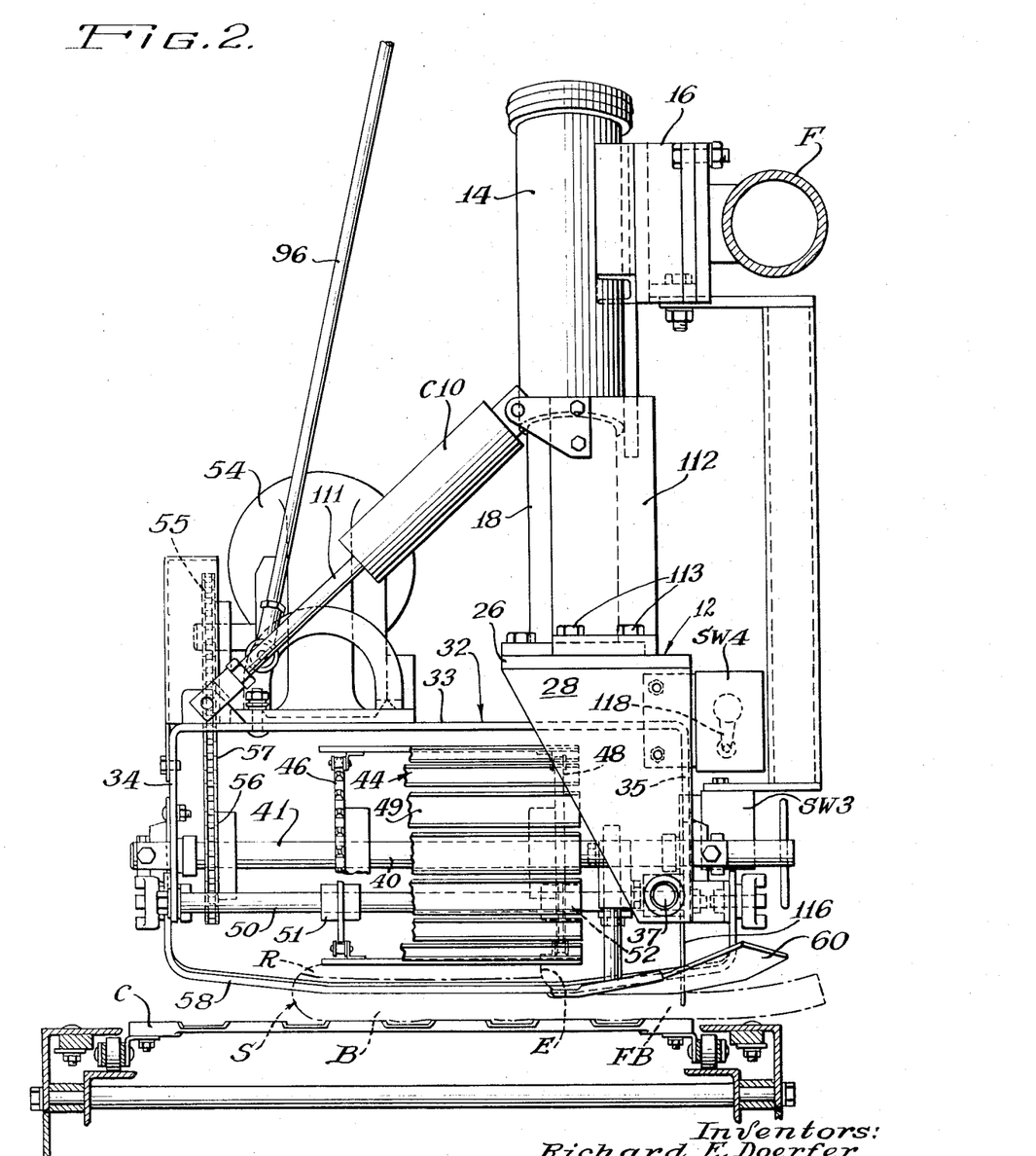
FIG. 2 is an end view of the rib cutting mechanism, illustrating the components in the rib cutting position prior to tilting.
Figure 3:
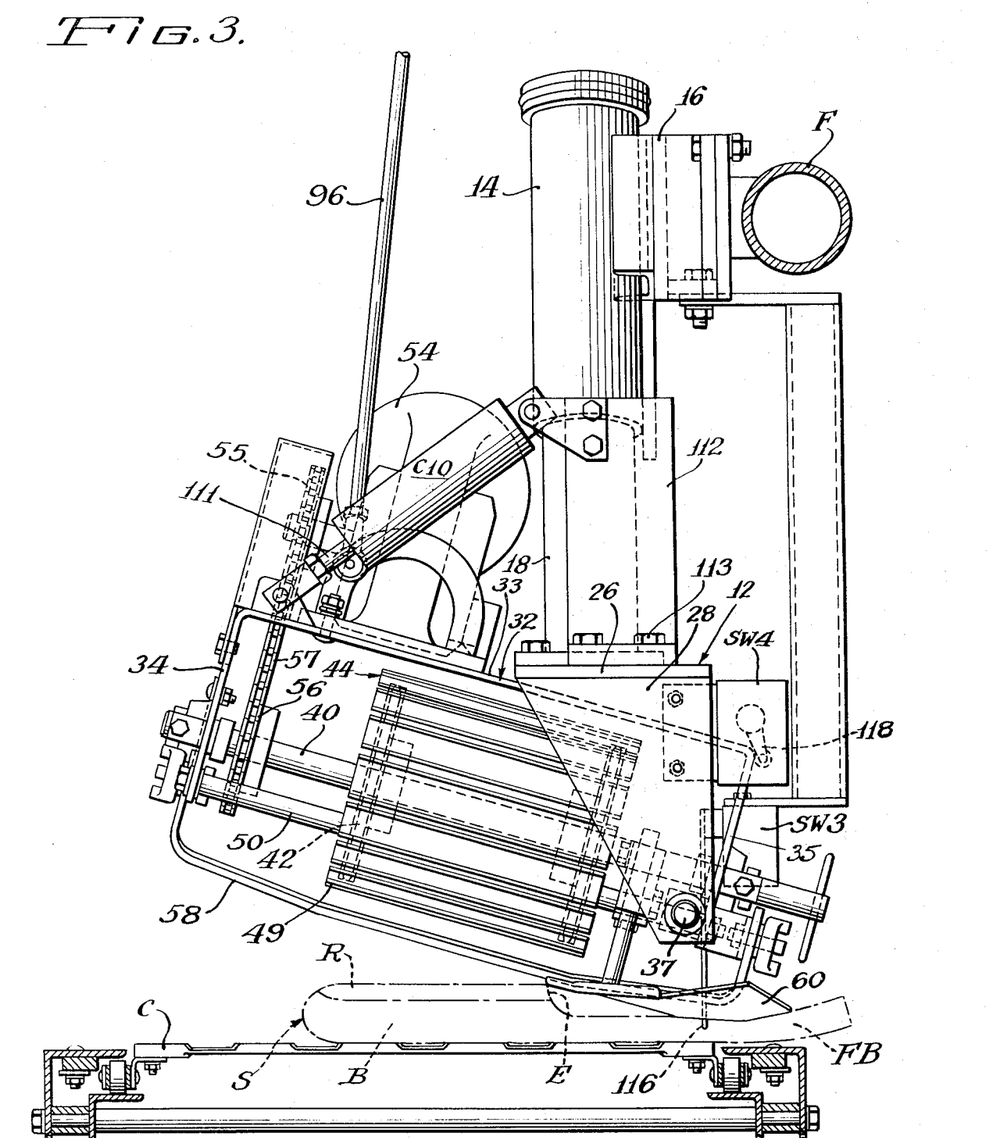
FIG. 3 is an end view of the rib cutting mechanism similar to FIG. 2, but illustrating the rib cutting mechanism in tilted position.

Referring to FIGS. 1, 2 and 3, there is illustrated an animal side processing machine PM, which incorporates the rib cutting mechanism 10 of the present invention. The rib cutting mechanism 10 of the present invention is an improvement over that shown in U.S. Pat. No. 3,546,737. It will be understood that the loin may be removed from the animal side by means of apparatus as shown in said U.S. Pat. No. 3,546,737 or as shown in the copending application Ser. No. 178,913 filed Sept. 9, 1971 and entitled LOIN KNIFE MECHANISM. After the loin has been removed from the animal side, the animal side S is conveyed by the conveyor means C carried on the frame F to the rib cutting mechanism 10.

The rib cutting mechanism 10 comprises a support weldment 12 mounted for movement toward and away from the conveyor C by guide means which include guide tubes 14, 15 that are connected to the frame bracket 16. The frame bracket 16 is suitably secured to the frame F of the processing machine PM. The weldment 12 is supported for movement in a vertical plane by a pair of members 18, 19 telescoping within guide tubes 14, 15. The tubular members 18, 19 have an external configuration complementary to the internal configuration of guide tubes 14, 15. The lower end of each telescoping member 18, 19 is connected to a bracket 21 that is secured to the top of weldment 12 as, for example, by bolts 20. The telescoping members 18, 19 may be tubular members cylindrical in cross-section. The weldment or support frame 12 comprises a generally U-shaped housing having a top 26 and depending spaced-apart sides 27 and 28.

Actuating means are provided for raising and lowering the support frame or weldment 12 in a generally vertical plane. The actuating means comprise a fluid cylinder C8 secured to the bracket 16 on frame F and a rod 30 connected at one end to a piston movable within the cylinder C8. The other end of rod 30 is pivotally secured to the support frame 12.

Pivotally carried on support frame 12 is a framework 32 having a top 33 and sides 34 and 35. Pivot pins 36, 37 extending from the sides 27, 28 of the support frame 12 journal bushings 38, 39 secured to wall or side 35 of the framework 32. Thus, framework 32 can pivot relative to support frame 12 about an axis through pivot pins 36, 37 for movement between a first position shown in FIG. 2 and a second position shown in FIG. 3. Rotatably carried in the walls 34, 35 of framework 32 are a pair of shafts 40, 41 upon which are mounted and to which are secured pairs of sprockets 42, 43 for carrying a power-driven slat conveyor 44 that applies a uniform traction on the top of an animal side, holding it on the conveyor means C during the rib cutting operation. The slat conveyor 44 is comprised of a pair of endless chains 46, 48 trained over the front and rear sprockets 42, 43, respectively. If desired, shaft 40 can be adjustably mounted with respect to shaft 41. This is accomplished by mounting the ends of shaft 40 in plates that are slotted and thus adjustably carried on framework 32 for movement toward and away from shaft 41. Channel-shaped cleats or slats 49 connect at each end to the chains 46, 48. Connected to the walls 34, 35 of framework 32 between the shafts 40, 41 are a pair of chain guide shafts 50. Carried fixedly on the chain guide shafts 50 in alignment with chains 46, 48 are chain guides 51, 52. The chain guides 51, 52 each comprise a hub having two holes therein for receiving shafts 50 and a depending portion for guiding the central travel of the lower run of the endless chains 46, 48.

The slat conveyor 44 is driven by a gear drive motor 54 secured to the support frame 12. Motor 54 is operatively connected to the slat conveyor 44 through output sprocket 55 on the motor 54 and sprocket 56 on shaft 41 which are operatively connected by chain 57.

Secured to the bottom of the framework 32 is the rib knife 58. The rib knife 58 is arranged diagonally to the direction of travel of conveyor C so as to enter the animal side S at one corner of the rib portion rather than along the entire leading edge of the rib knife. Also, since the ends of the ribs are diagonal to the side S itself, when the knife 58 is elevated to withdraw it from the side S, it leaves the meat on a diagonal line corresponding to the ends of the ribs. The knife 58 is sharpened with a bevel on the upper side and is mounted with the leading edge of the knife higher than the trailing edge in respect to the conveyor C. This arrangement provides an angle of attack which forces the knife up in a plowing effect which forces it to cut closely to the bottom of the ribs of the animal side. One arm of the knife 58 is secured to side 34 by suitable fastening means. The other arm of knife 58 is similarly connected to an offset portion of side 35 of the framework 32.

A fat deflector 60 secured to the framework 32 forwardly of knife 58 compresses the fatback FB of the side S and protects the knife 58 from cutting the fatback area which is generally beneath the area of the side or edge denoted E and the right hand end of the side, as seen for example in FIGS. 2 and 3. The designation E represents the sawed end of the ribs and the fatback area would be that below the fat deflector 60. The forward end of the deflector 60 is curved upwardly so as to appropriately receive an animal side thereunder. Cylinder C8 functions as an air spring, and rod 30 and frame 12 secured thereto can move up and down relative to conveyor C to accommodate variations in thickness of the side S. The rib knife 58 is automatically positioned vertically by the thickness of the side S and it immediately cuts under the ribs R. The angle at which the rib cutting knife 58 is set and the angle at which the edge is sharpened are selected to satisfy the requirement that the knife cuts as close to the underside of the ribs as possible. The knife 58 is designed with a curvature throughout its length which corresponds to the natural curvature of the ribs and thus provides effective cutting.

Disposed downstream from the support frame 12 is a drive drum or belly drum 70 rotatably supported in a belly drum frame 72. The frame 72 is connected to guide rod or guide shaft 74 that is adapted to be slidably supported or telescopically supported within the guide tube 76 to guide the drum for up and down movement in substantially a vertical plane. Guide tube 76 is fixedly secured to frame bracket 16 as are guide tubes 14, 15. Supported on the frame 72 is a drive motor 78 which is operatively connected to the belly drum 70 through a chain and sprocket arrangement 80, 81, 82 for driving the shaft 84 and thus rotating the drum 70. Shaft 84 is secured to the sides of the drum for rotation therewith. The external configuration of the drum is solid and has a plurality of cleats 71 extending outwardly therefrom. The independently mounted drive drum 70 will pull the side S down the conveyor C free of the cutting knife 58. The frame 72 carrying the drive drum 70 is mounted so as to permit it to seek an elevation on the side S independently of the height or position of the support frame 12.

In order to stabilize movement of the belly drum frame 72, a lever 90 is secured to the upper end of the guide element 74. The other end of the lever 90 carries a roller 92 which is guided in a trackway 94 carried on the main frame F. The axis of the belly drum 70 will thereby be maintained generally at right angles to the direction of conveyor travel.

Means are provided for counterbalancing the weight of the framework 32, the frame 72 and the components carried on the framework 32 and frame 72, respectively. Tie rod or connecting rod 96 is pivotally connected at one end to the top of framework 32 and at the other end to a lever 97 pivoted on main frame F. The lever 97 carries a counterweight 98 thereon on the opposite end of the pivot point 99. Similarly, tie rod or connecting rod 100 is pivotally connected at one end through a clevis to frame 72 and at the other end to a lever 102 pivoted on main frame F. The lever 102 carries a counterweight 104 on the end opposite the end connected to rod 100.

A feature of the present invention is the provision of means for tilting the rib cut knife relative to the animal side to provide a desirable taper on the end of the cut rib. The tilting means comprises a fluid cylinder C10 pivotally secured at one end to a weldment 112 that is affixed to the support frame 12 by suitable fastening means, for example, hex head screws 113 and nuts 114. The cylinder rod 111 is connected through a clevis to the frame 32. Actuation of the cylinder C10 will pivot frame 32 about the axis through the pivot pins 36, 37 to move the rib cutting mechanism from the position shown in FIG. 2 to the position shown in FIG. 3.

In operation, when the leading edge of the side S strikes the actuator wire 116 of tilt switch SW3 which is supported on the frame F, a pneumatic force is applied to the pneumatic cylinder C10 to pivot the framework 32 about the axis of pivot pins 36, 37. As framework 32 pivots, a portion of wall 35 contacts actuator arm 118 of lift switch SW4, moving same to actuate switch SW4. The lift cylinder C8 is actuated to raise the support frame 12 and knife 58 carried therewith from the side S pulling the knife 58 upward and freeing it from the meat. This withdrawal of the knife 58 is timed so as to cut off the ribs on a line corresponding to the upstream end thereof (diagonal to the direction of conveyor travel).

Figure 4:
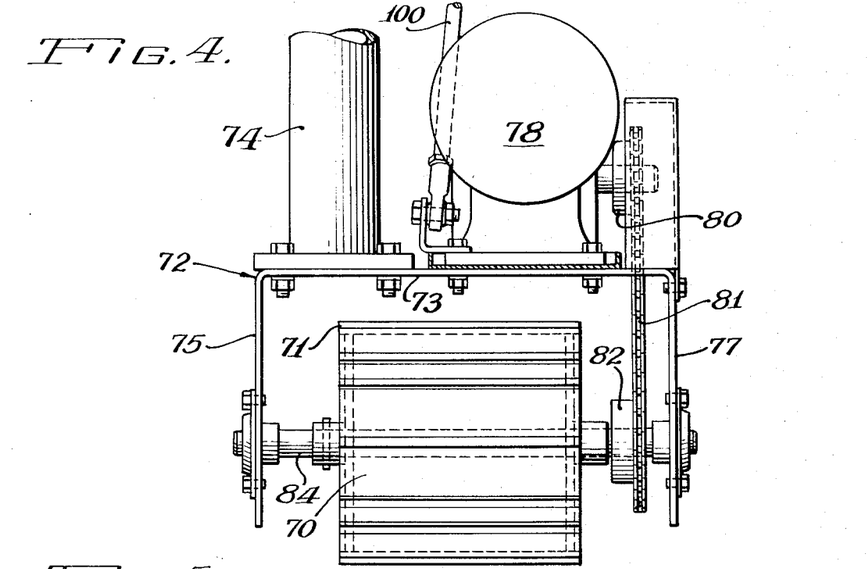
FIG. 4 is a detail rear view of the rib cutting mechanism better illustrating the drive wheel.

Turning now to FIG. 4, there is illustrated a rear view of the rib cutting mechanism better illustrating the belly drum 70. The frame 72 comprises a top 73 and a pair of depending arm portions 75, 77. The drive motor 78 and the tubular guide rod 74 are secured to the top 73. The depending arm portions 75, 77 journal the shaft 84 that carries the belly drum 70 thereon. The belly drum 70 has a plurality of slats or cleats 71 thereon which extend across the belly drum 70 substantially at right angles to the direction of travel of the conveyor C. The output shaft from gear motor 78 has a sprocket 80 fixed thereon. Shaft 84 has a sprocket 82 fixed thereon. Chain 81 is trained over the sprockets so as to drive sprocket 82 and belly drum 70 upon rotation of gear motor 78.

Figure 5:
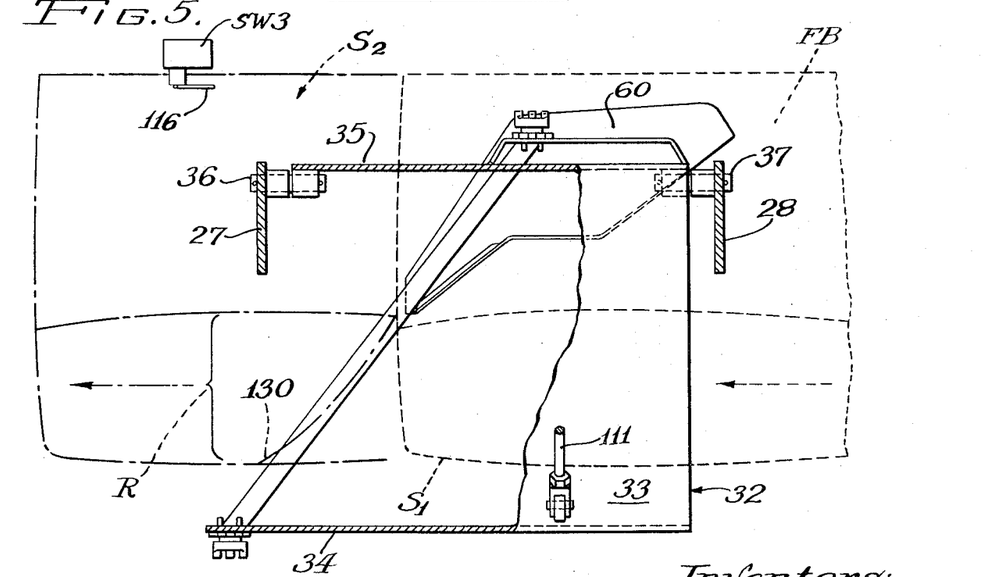
FIG. 5 is a plan view illustrating the movement of animal sides through the rib cutting mechanism and the relationship between the rib cutting knife and the animal sides.

Referring to FIG. 5, there is illustrated somewhat schematically the position of the rib cutting knife 58 and the fat deflector 60 relative to an animal side S being processed. Rib knife 58 is at an angle to the animal side and enters below the rib R of side S at the S position. The side is engaged by the slat conveyor and moved to the S position with the knife 58 cutting the rib from the side. The knife 58 tilts about the axis through pivot pins 36, 37, thus raising one end of the knife 58 commencing as indicated in the region of numeral 130 to provide a more angled cut on the tail end of the rib portion. After the knife 58 tilts in response to actuation of tilt switch SW3 and tilt cylinder C10, the cylinder C8 is actuated upon actuation of raise switch SW4 to raise support frame 12 and pull the knife 58 straight up out of the side S.

Figure 6:
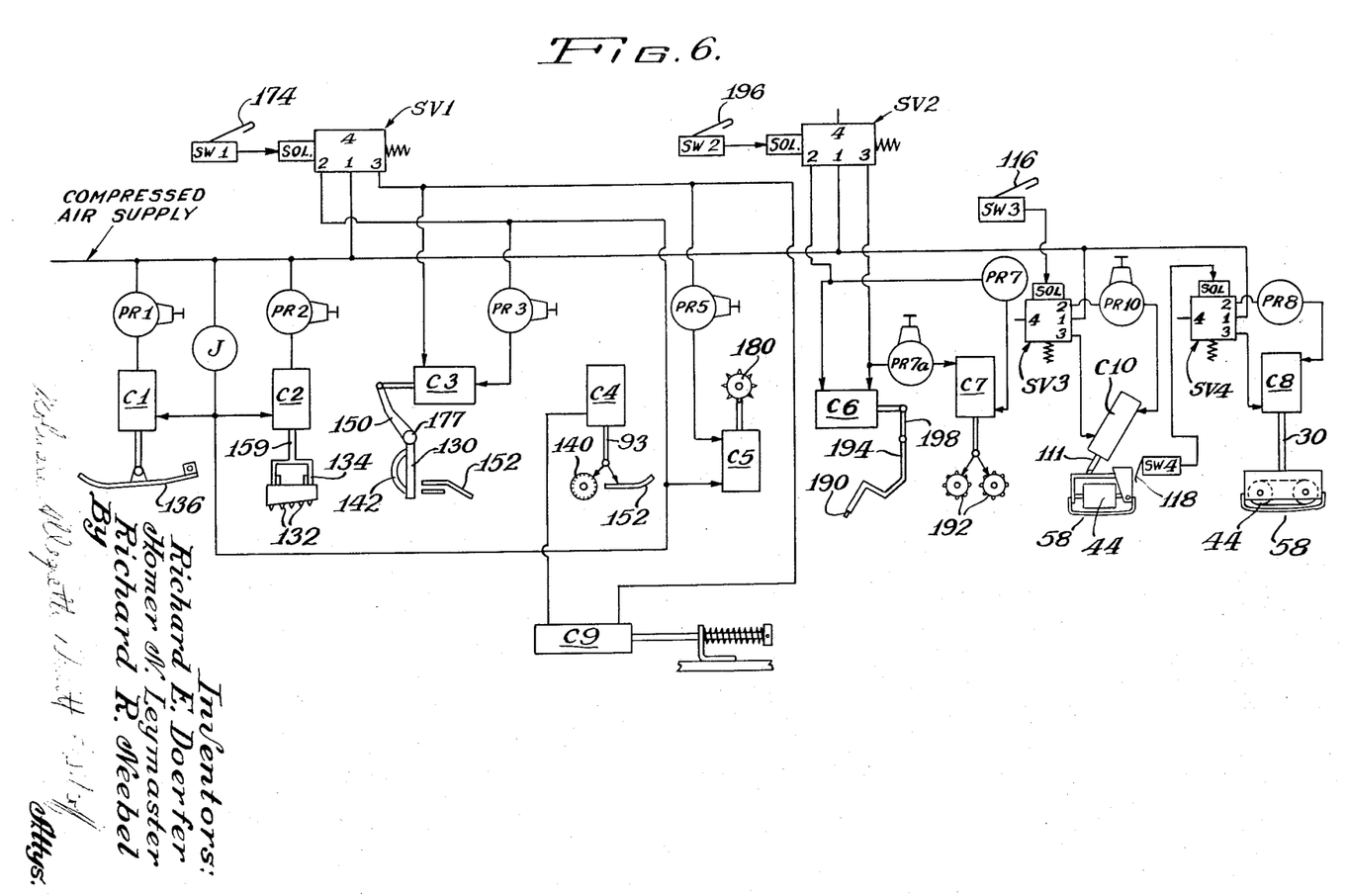
FIG. 6 is a diagrammatic view of a portion of the control system of the animal side processing machine illustrating the essential components of the rib cutting mechanism.

Turning now to FIG. 6, there is illustrated a schematic view of a portion of the control system of the animal side processing machine PM, illustrating the essential components of the rib cutting mechanism. Further explanation of the control system may be found in U.S. Pat. No. 3,546,737 and copending application Ser. No. 178,913 filed Sept. 9, 1971 entitled LOIN KNIFE MECHANISM.

Briefly summarizing the operation of the animal processing machine PM prior to the rib cutting station, an animal side is moved on a conveyor toward the loin scribe saw 140 and the loin pull knife 142 by stud ponds 132 mounted on a gripper chain 134. The speed of the conveyor C and the gripper chain 134 are synchronized and a gripper chain rider arm 136 is inclined downwardly in a direction of travel to better hold the side S in a firm position against the conveyor as it reaches and passes through the loin scribe saw 140 and the loin pull knife 142. Rider arm 136 is forced down against the center of the side S by its own weight as well as by an adjustable fluid cylinder C1 acting as an air spring. In a presently preferred embodiment, all the fluid cylinders are pneumatic. Compressed air is supplied to the cylinder C1 through an adjustable pressure regulator PR1. Cylinder C2 acts upon the frame supporting the gripper chain 134 through the piston rod 159. The cylinder C2 also acts as an air spring and a pressure regulator PR2 is provided for cylinder C2.

A lever 150 secured to the cutter arm or frame 130, which carries the loin scribe saw 140 and the loin pull knife 142, is actuated by cylinder C3 acting as an air spring through the action of pressure regulator PR3. The cutter arm 130 also carries a scribe saw shoe or guide 152 which functionally positions both the loin scribe saw 140 and the loin pull knife 142 for their initial cuts. The assemblage comprising the loin scribe saw 140 and the loin pull knife 142 is pivotally mounted about a pivot 177.

The animal side processing machine includes vertical positioning mechanism for the loin pull knife 142. The piston rod 93 of cylinder C4 acts as a support guide rod for the scribe saw 140 and the shoe 152. The cylinder C4 can be pneumatically actuated by the operation of a jam valve J for lifting the scribe saw 140 and shoe 152 as will be hereinafter apparent. The vertical and horizontal position of the scribe saw shoe 152 determines the initial position of the loin knife 142. However, as the side S is moved further along by the conveyor S, it actuates switch actuator 174 of microswitch SW1, which then activates the cylinder C3 to reposition the entire cutter arm 130 and thereby the saw 140 and knife 142 by the switch opening of solenoid valve SV1. Cylinder C9 is actuated to squeeze the loin pull knife 142 as more fully explained in copending application Ser. No. 178,913 filed Sept 9, 1971 entitled LOIN KNIFE MECHANISM.

The solenoid valve SV1 is a double-acting type with spring return, supply inlet 1, normal outlet 2, operated outlet 3 and exhaust 4. Solenoid valves SV2, SV3 and SV4 are of the same type. The cylinder C3 is also under control of the switch SW1 and solenoid valve SV1.

When the side S has tripped the switch acutator wire 174 to close the switch SW1, a loin drive drum 180 is automatically forced down on the already cut portion of the loin, which is still lying on top of the remainder of the side S in order to help pull the entire side through the loin cutting and sawing operation and on to the next station of the animal side processing machine PM. This is accomplished through a pressure regulator PR5 by a cylinder C5 also actuated by the switch SW1 and the solenoid valve SV1. The cylinder C5 normally keeps the drum 180 raised by flow of compressed air from outlet 2 of the valve SV1.

After the side S has passed the switch actuator 174 and the actuator has returned to its normal position, the cylinder C3 which controls the two positions of the saw and knife automatically returns the saw 140 and the knife 142 to their respective starting positions through the action of the switch SW1 and solenoid valve SV1. At the same time the loin drive drum 180 is raised through the action of the same switch and valve.

After the loin has been pulled, the side S proceeds on the conveyor C toward the loin push-off operation. When the side S actuates a trip arm 196, the solenoid valve SV2 is actuated through the switch SW2 to control the flow of compressed air to the cylinder C6 for moving the actuating arm 198. The kick-off shoe will be actuated through the tube assembly 194 to push the pulled loin off the side of the conveyor C and into a container or onto a separate conveyor.

At the same time that the cylinder C6 (controlled by pressure regulator PR7A) is actuated, the switch SW2 effects lowering of the drums 192, which is normally in the raised position through the action of a cylinder C7 and pressure regulator PR7.

Slightly preceding the above operation, in order to hold the side S in position during the loin push-off operation, the pair of drums 192 drop on the remaining rib section of the side S under the pressure of the pneumatic cylinder C7. This holding operation is also triggered by the trip arm 196 of the switch SW2. The drums 192 are raised automatically after the side S has passed and allowed trip arm 196 to assume its normal vertical position.

After the loin has been removed, the remaining portion of the side S proceeds down the conveyor and is contacted by the fat deflector 60 which compresses the fatback and protects the knife from cutting in this area. The slat conveyor 44 engages the sides to propel the side through the rib cutting knife 58.

When the leading edge of the side S strikes an actuator 116 located on frame F downstream of the slat conveyor 32, switch SW3 and solenoid valve SV3 are actuated, and pneumatic force is applied to the pneumatic cylinder C10 (normally under control of pressure regulator PR10) to tilt the framework 32 containing the rotatable slat conveyor 44 in order to raise one end of the knife 58 and provide a more angled cut on the tail end of the rib. As framework 32 pivots, switch actuator 118 is moved to energize switch SW4 and actuate solenoid valve SV4. Then, through the action of the raise cylinder C8 (normally under the control of pressure regulator PR8), the support frame 12 and framework 32 are raised, pulling the knife 58 from the meat. The withdrawal is timed so as to cut off the ribs on a diagonal line corresponding to the desired taper (as best seen in FIG. 5.)

After the rib cutting knife 58 is free from the animal side S, the side S is pulled down the conveyor by means of the drive drum 70 which is driven by the drive mechanism 78 (FIG. 4).

An operator at the discharge end of the animal side processing machine can lift the ribs from the remaining portion of the side and place them in a separate container, conveyor or the like, thus completing the rib cutting operation. If desired, an automatic rib ejector may be utilized and reference to this feature may be made to copending application Ser. No. 178,915 filed Sept 9, 1971, now U.S. Pat. No. 3,739,903, entitled APPARATUS FOR DIVERTING ARTICLES FROM A PATH OF TRAVEL. It will be understood from the summary of operation that the cylinders C1 and C2 represent a preliminary feed station, the cylinders C3, C4 and C9 a loin pull station, the cylinder C5 an intermediate feed station, the cylinder C6 a push-off station, the cylinder C7 a second intermediate feed station, and cylinders C8 and C10 a rib cut station. Beyond the rib cut station, the independent motor driven drum 70 of FIG. 4 constitutes the final feed station.

There has been provided by the present invention an improved animal side processing machine having a novel rib cutting mechanism incorporating a rib cut knife disposed at an angle with respect to the travel of the conveyor conveying animal sides to the rib cutting mechanism, with tilting means for tilting the rib cut relative to the animal side to provide the desirable taper on the end of the cut rib. In operation, control means are provided responsive to the position of the animal side to actuate the tilt means to tilt the rib cut knife and then actuate the raising means to lift the rib cut knife from the animal side.

While there has been shown a presently preferred embodiment of the present invention, it will be obvious to those skilled in the art that the invention is not so limited since it may be otherwise embodied within the scope of the following claims.

We claim:

1. An animal side processing machine, comprising, in combination, frame means, a rib cutting station on said frame means, means on said frame means for conveying animal sides in a substantially fixed position relative to said conveying means, said conveying means moving said animal sides to and from said rib cut station, a rib cut knife mounted on said frame means at said rib cutting station in a position for removing a rib section from each of said animal sides, and means for changing the orientation of said rib cut knife relative to said rib section in accordance with the changing contour of said ribs, as said rib cut knife is removing said rib section from an animal side.

2. The machine of claim 1 wherein said rib cut knife is disposed at an angle relative to the direction of travel of said conveying means, and includes means for raising said rib cut knife from the animal side after the rib cut knife has cut a rib section therefrom.

3. The machine of claim 1 wherein said orientation changing means includes means for pivoting said rib cut knife upwardly relative to said animal side to provide a desirable taper on the end of said rib section.

4. The machine of claim 3 including control means responsive to the position of said animal side for actuating said pivoting means thereby changing the orientation of said rib cut knife relative to said rib section.

5. The machine of claim 1 including control means responsive to the location of said animal side for actuating said orientation changing means for properly moving said rib cut knife relative to said rib section.

6. The machine of claim 1 wherein said conveying means includes a rotatable means comprising a rotatable slat conveyor for applying uniform traction on the top of said animal side for holding said animal side on the conveying means during the rib cutting operation.

7. The machine of claim 1 including a first frame supported on said frame means for movement toward and away from said conveying means, and a second frame pivotally supported on said second frame, said rib cut knife being secured to said second frame, at least a portion of said conveying means being carried by said second frame.

8. The machine of claim 7 wherein said orientation changing means includes a fluid cylinder means connected between said first frame and said second frame.

9. The machine of claim 2 wherein said raising means includes fluid cylinder means.

10. The machine of claim 3 including a control switch mechanism on said frame means actuable by an animal side in a predetermined location of said animal side on said conveying means for actuating said pivoting means.

11. The machine of claim 10 including means for raising said rib cut knife from said animal side after said rib cut knife has cut a rib section, a raise switch mechanism responsive to pivoting of said rib cut knife for actuating said raising means after said rib cut knife has been pivoted.

12. The machine of claim 1 including a belly drum positioned downstream of said rib cut station for pulling said animal side down the conveying means free from said rib cut knife, after said rib cut section has been removed from said animal side.

13. The machine of claim 1 wherein said conveying means includes a gripping conveyor for applying uniform traction on the top of said animal sides for holding said animal side on the conveying means during the rib cutting operation.

* * * * *